(12) United States Patent
Gottimukkala et al.

(10) Patent No.: US 8,424,053 B2
(45) Date of Patent: Apr. 16, 2013

(54) METHOD OF DYNAMICALLY UPDATING NETWORK SECURITY POLICY RULES WHEN NEW NETWORK RESOURCES ARE PROVISIONED IN A SERVICE LANDSCAPE

(75) Inventors: Sivaram Gottimukkala, Morrisville, NC (US); Lap Huynh, Cary, NC (US); Dinakaran Joseph, Apex, NC (US); Linwood Overby, Jr., Raleigh, NC (US); Wesley Devine, Apex, NC (US); Michael Behrendt, Randersacker (DE); Gerd Breiter, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 12/166,243

(22) Filed: Jul. 1, 2008

(65) Prior Publication Data
US 2010/0005505 A1    Jan. 7, 2010

(51) Int. Cl.
*H04L 29/06* (2006.01)
(52) U.S. Cl.
USPC ............... 726/1; 726/2; 726/3; 726/4; 726/5; 726/6; 713/151; 713/152; 713/153; 713/154; 713/155
(58) Field of Classification Search ............ 726/1
See application file for complete search history.

(56) References Cited

U.S. PATENT DOCUMENTS

| 2003/0110397 A1 | 6/2003 | Supramaniam et al. |
| 2006/0206489 A1 * | 9/2006 | Finnie et al. ................ 707/10 |
| 2008/0008202 A1 * | 1/2008 | Terrell et al. ............... 370/401 |
| 2008/0059214 A1 | 3/2008 | Vinberg |

FOREIGN PATENT DOCUMENTS

| EP | 1 420 564 | 12/2006 |
| WO | WO 00/69145 | 11/2000 |

* cited by examiner

*Primary Examiner* — Longbit Chai
(74) *Attorney, Agent, or Firm* — Novak Druce Connolly Bove + Quigg LLP

(57) ABSTRACT

A computer-implemented method is provided for updating network security policy rules when network resources are provisioned in a service landscape instance. The method includes categorizing network resources in a service landscape instance based on a service landscape model. The method further includes responding to the provisioning of a network resource by automatically generating one or more security policy rules for a newly-provisioned network resource. Additionally, the method includes updating security policy rules of pre-existing network resources in the service landscape instance that are determined to be eligible to communicate with the newly-provisioned network resource so as to include the newly-provisioned network resource as a remote resource based on the service landscape model.

20 Claims, 5 Drawing Sheets

METHOD OF DYNAMICALLY UPDATING NETWORK SECURITY POLICY RULES WHEN NEW NETWORK RESOURCES ARE PROVISIONED IN A SERVICE LANDSCAPE

FIELD OF THE INVENTION

The present invention is related to the field of provisioning services in a data communications network environment, and more particularly, to techniques for dynamically updating network security policy rules when new network resources are provisioned in a service landscape instance.

BACKGROUND OF THE INVENTION

One result of advances in information technology (IT) is the emergence an on-demand, pay-as-you-go utility model for software development and deployment. According to this model, applications and other IT resources are provided to customers by a service provider through a data communications network, especially the Internet. A particular model is the software-as-a-service (SaaS) model of software deployment whereby an application is hosted as a service that is provided to customers over the Internet. Among the advantages of the model is that it obviates the need to install and run the application on a customer's own computer and mitigates customer difficulties pertaining to software maintenance. SaaS also can reduce the customer's up-front costs of software purchases, through less costly, on-demand pricing. For a vendor, SaaS can be a mechanism for protecting the vendor's intellectual property and can generate an on-going revenue stream. A SaaS vendor may host the application on its own web server, or provide the application through a third-party application service provider (ASP).

Under such a utility model, because data is exchanged over a network, security is an important consideration. Network resources thus typically must maintain security policy rules which control actions for traffic between the network resources. These rules typically establish conditions that include a local Internet Protocol (IP) address and port as well as a remote IP address and port. Examples of such security policy rules are those used for IP packet filtering, by the IPsec (IP security) suite of protocols for securing IP communications by authenticating and/or encrypting each IP packet in a data stream, and by the IBM z/OS Application Transparent Transport Layer Security (AT-TLS).

As new network resources are provisioned and added to a service landscape instance, policy rules in the newly-provisioned network resource must be created so as to permit communication between the newly-provisioned network resource and eligible, remotely-located network resources. Additionally, when a network resource is provisioned, other resources in the service landscape instance must be updated to allow communication between the newly-provisioned network resource and pre-existing network resources. Enabling security for an IT infrastructure, such as configuring system firewalls and intrusion defenses, however, typically involves considerable manual configuration effort and generally requires platform-specific expertise. The process, if performed manually, can be time-consuming, error-prone, and potentially disruptive. Enabling security to protect networked systems that form the service landscape instance, however, is likely to be a key factor in the acceptance and deployment of new on-demand services.

SUMMARY OF THE INVENTION

In view of the foregoing background, it is therefore a feature of the invention to provide effective and efficient mechanisms for dynamically updating network security policy rules when new network resources are provisioned in a service landscape. This and other features and advantages in accordance with the present invention are provided by the methods and systems described herein.

One embodiment of the invention is a computer-implemented method for updating network security policy rules when network resources are provisioned in a service landscape instance. The method can include categorizing network resources in a service landscape instance based on a service landscape model. The method can also include responding to the provisioning of a new network resource by automatically generating one or more security policy rules for the newly-provisioned network resource. The method can further include updating security policy rules of pre-existing network resources in the service landscape instance that are determined to be eligible to communicate with the newly-provisioned network resource so as to include the newly-provisioned network resource as a remote resource based on the service landscape model.

According to another embodiment of the invention, a method for updating network security policy rules when network resources are provisioned in a service landscape instance can include provisioning a network resource to the service landscape instance by adding the newly-provisioned network resource to a pre-existing resource database. The method can further include associating a group name with the newly-provisioned network resource, the group name corresponding to a collection of network resources that are referred to in pre-configured policy rules that specify required security actions for the network resources of the service landscape instance. More particularly, the group name can be specified in place of a network address in the configured policy rule.

Still another embodiment of the invention is a system for updating network security policy rules when network resources are provisioned in a service landscape instance. The system can include one or more processors for executing processor-executable code. The system also can include a categorizing module configured to execute on the one or more processors for categorizing network resources in a service landscape instance based on a service landscape model. Additionally, the system can include a rule-generating module configured to execute on the one or more processors for responding to a provisioning of a network resource by automatically generating one or more security policy rules for the newly-provisioned network resource. The system can further include a policy-updating module configured to execute on the one or more processors for updating security policy rules of pre-existing network resources in the service landscape instance that are determined to be eligible to communicate with the newly-provisioned network resource so as to include the newly-provisioned network resource as a remote resource based on the service landscape model.

A system for updating network security policy rules when network resources are provisioned in a service landscape instance, according to yet another embodiment, can include one or more processors for executing processor-executable code and a name-associating module configured to execute on the one or more processors for responding when a network resource is provisioned. The name-associating module can be configured to add the newly-provisioned network resource to a pre-existing resource database of the service landscape instance. The module can be further configured to associate a group name with the newly-provisioned network resource, wherein the group name corresponds to a collection of network resources that are referred to in pre-configured policy rules specifying required security actions for the network resources of the service landscape instance, and wherein the group name is specified in place of a network address in the configured policy rule.

BRIEF DESCRIPTION OF THE DRAWINGS

There are shown in the drawings, embodiments which are presently preferred. It is expressly noted, however, that the invention is not limited to the precise arrangements and instrumentalities shown in the drawings.

DETAILED DESCRIPTION

The invention is directed to methods and systems for dynamically updating network security policy rules when new network resources are provisioned in a service landscape. The following terms, as defined, are used herein to describe various embodiments of the invention:

Software-as-a-Service (SaaS). SaaS denotes a software distribution service model wherein a software application is hosted by a service provider, and service subscribers can access the service over a private computer communications network or a public computer communications network such as the Internet;

Platform-as-a-Service (PaaS). PaaS denotes, generally, any area or portion of an SaaS focused on hosting software that provides a development/test platform, such as an integrated development environment (IDE) software application that provides comprehensive facilities which can be used by a computer programmer for software development;

Service Landscape. A service landscape is a SaaS architecture model for delivering a service, an example of which is a multi-tier web service (e.g., a three-tier architecture comprising a web server, application server, and database server) delivery model; and Service Landscape Instance. A service landscape instance is a realization or instantiation of a service landscape in which various IT resources (e.g., servers, network, and storage) are provisioned and managed according to a service subscription Service Level Agreement (SLA).

Figure 1:
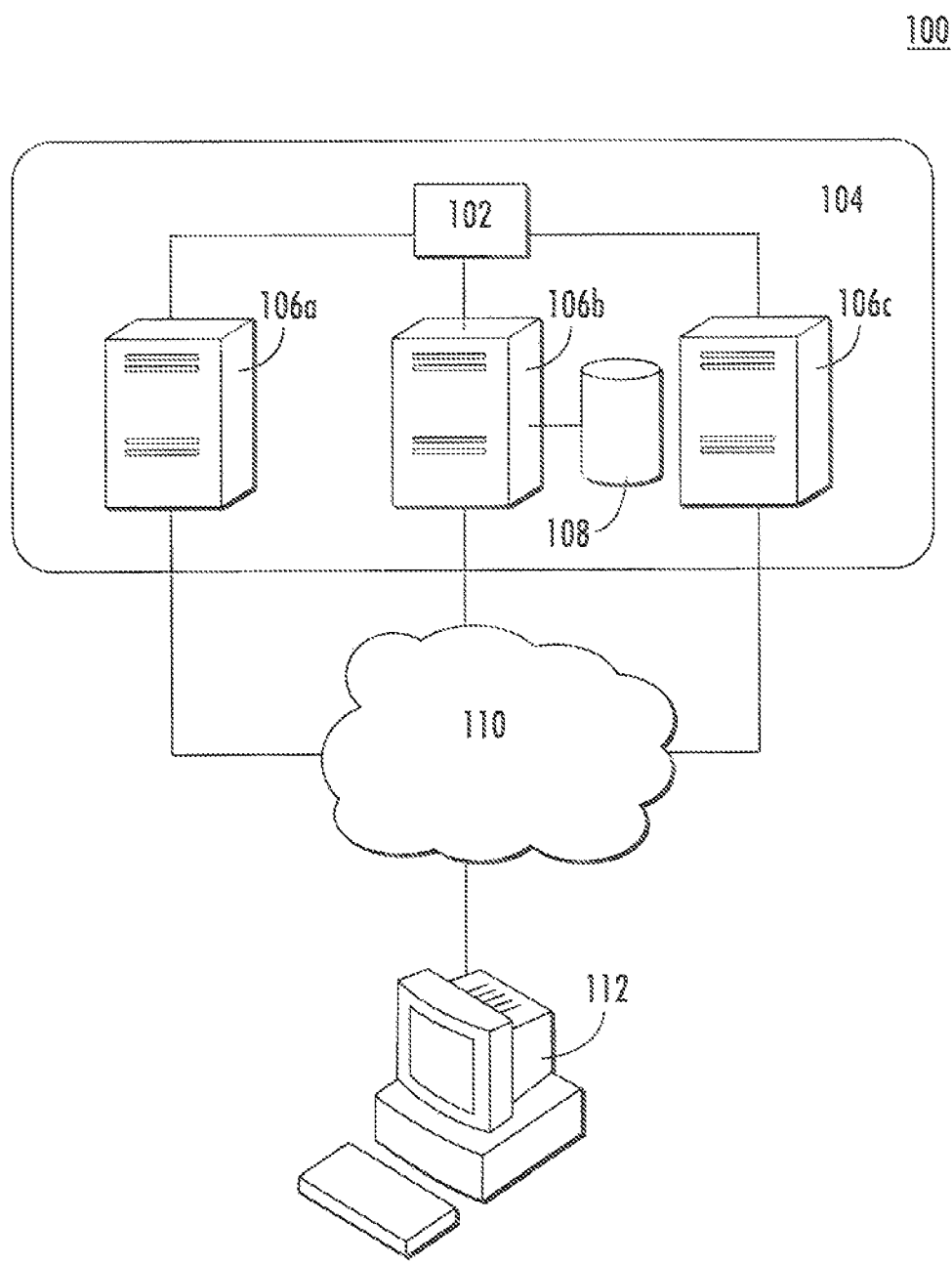
FIG. 1 is a schematic view of a network environment in which a system for updating network security policy rules when network resources are provisioned in a service landscape instance, according to one embodiment of the invention, can be advantageously utilized.

Referring initially to FIG. 1, a schematic view is provided of an exemplary network environment 100 in which a system 102 for updating network security policy rules, according to one embodiment, can be advantageously utilized. The network environment 100 includes a service landscape instance 104 in which the system 102 is deployed. Consistent with the definition set forth above, the service landscape instance 104 illustratively includes three computing devices 106a-c and at least one database 108 communicatively linked to one of the computing devices 106b. Illustratively, the computing devices 106a-c are communicatively linked through a data communications network 110, such as the Internet. As shown, one or more other computing devices 112 can communicatively link to the one or more of the computing devices 106a-c through the data communications network 110 for accessing network resources, such as an SaaS or PaaS application, residing on one computing device or distributed among the computing devices.

Although the service landscape instance 104 illustratively includes three computing devices 106a-c, it will be readily apparent from the description set forth herein that more or fewer computing devices can be included in the service landscape instance 104. Moreover, though not explicitly shown, the service landscape instance 104 can further include various applications (e.g., an SaaS and/or PaaS) or other network resources residing on one or more of the computing devices 106a-c.

Preferably, the computing devices 106a-c are servers for hosting applications and other network resources that can be accessed by a remote device or system over the data communications network 110. In alternate embodiments, however, one or more of the computing devices 106a-c can comprise various other types of general-purpose or application-specific computing devices. It is also noted that though the communications links between the various elements of the network environment 100 are shown as wired connections that traverse the data communications network 110, which can include various intermediate nodes not explicitly shown, the communications links can alternatively or additionally comprise wireless communication links.

Figure 2:
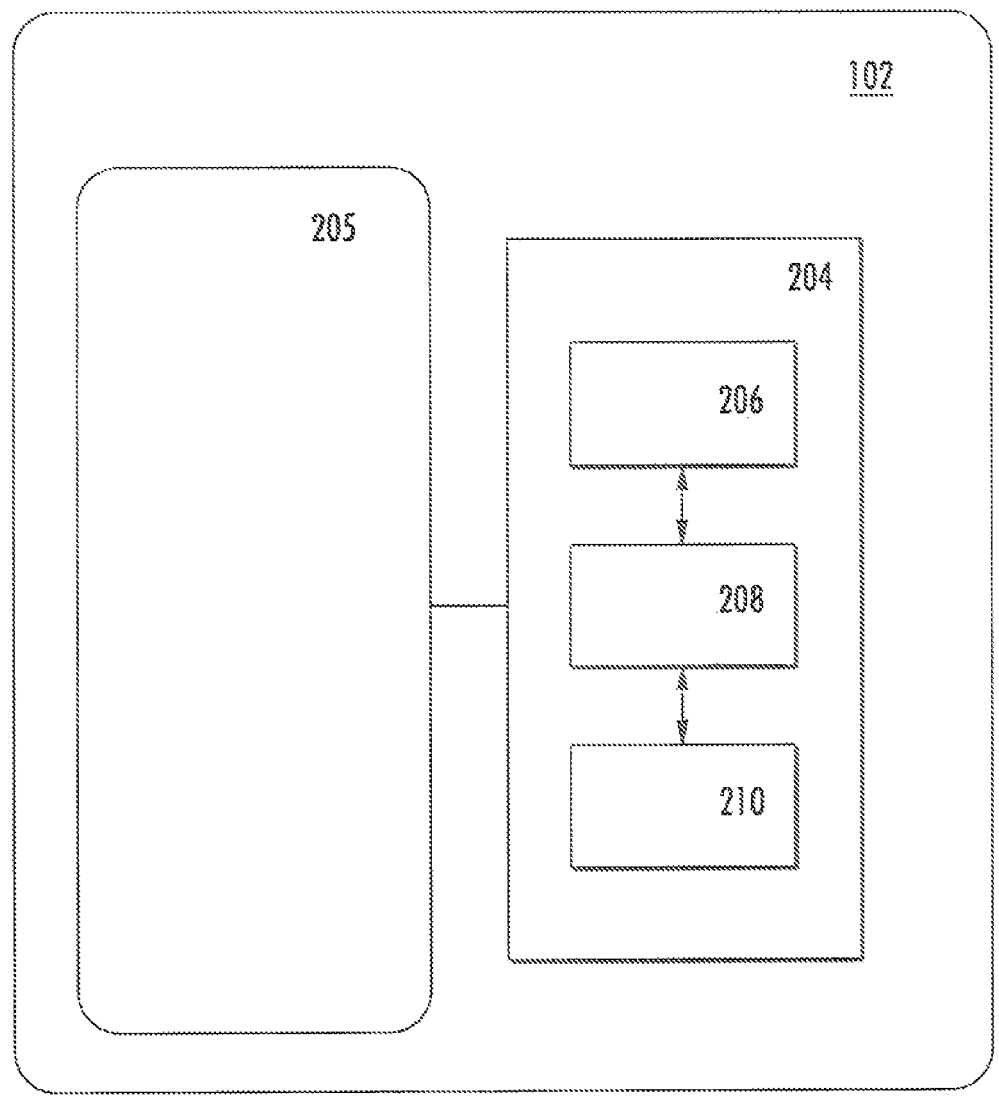
FIG. 2 is a schematic view of a system for updating network security policy rules when network resources are provisioned in a service landscape instance, according to one embodiment of the invention.

Referring additionally to FIG. 2, a more detailed schematic view of the system 102 is provided. The system 102 illustratively includes one or more processors 204. Though not explicitly shown, the one or more processors 204 can each comprise a plurality of registers, an arithmetic-logic unit, and a control unit. Thus, the system 102 can be configured to process processor-executable instructions in a single-thread, single-processor environment, in a single-thread, multi-processor environment, or in a multi-thread, multi-processor environment. Moreover, the one or more processors 204 can exist on a single computing device or on different computing devices. When the system 102 is implemented in multiple computing devices according to a distributed computing architecture, the devices can be co-located at a common site. Alternately the computing devices can be remotely-located from one another and configured to communicate through the data communications network 110. Optionally, the system 102 can further include one or more main memory elements 205 for electronically storing processor-executable instructions and data representations.

The system 102 also illustratively includes a categorizing module 206, a rule-generating module 208, and a policy-updating module 210. Preferably, the categorizing module 206, rule-generating module 208, and policy-updating module 210 are implemented in a combination of logic-based processing circuitry and processor-executable code for carrying out the procedures and functions described herein. Accordingly, each of the categorizing module 206, rule-generating module 208, and policy-updating module 210 can be configured to execute on the one or more processors 204. Alternatively, however, one or more of the categorizing module 206, rule-generating module 208, and policy-updating module 210 can be implemented in dedicated hardwired circuitry configured to cooperatively operate in conjunction, but not under direct control of, the one or more processors 204 for carrying out the same procedures and functions.

Operatively, the categorizing module 206 categorizes network resources in the service landscape instance 104 based on a particular service landscape model. According to a particular embodiment, the categorizing module 206 categorizes the network resources according to a role each network resource performs in the service landscape instance and according to a tier occupied by the network resource in a multi-tier hierarchical topology determined based upon the service landscape model. Thus, if the network resources of the service landscape instance 104 comprise, for example, an application server, a File Transfer Protocol (FTP) server, and database server, each server has a definite role for performing a unique function within the service landscape instance 104 The categorizing module 206 thus categorizes the application server, FTP server, and database server according to that server's particular role or function.

According to this embodiment, because the service landscape model can be used to construct a multi-tier hierarchical topology, the categorizing module 206 additionally categorizes the network resources of the service landscape instance 104 according to the particular tier each occupies in the multi-tier hierarchy. One tier, for example, can correspond to a so-called demilitarized zone (DMZ), a physical or logical sub-network that contains and exposes external services of the service landscape instance to a larger, albeit not trusted, network such as the Internet. Other tiers can include an application server tier and an enterprise information system (EIS) tier. Regardless of the particular tier to which a distinct network resource corresponds, the categorizing module 206 categorizes the network resource according to the specification of the service landscape model. According to still another embodiment, the categorizing module 206 can further categorize each network resource of the service landscape instance 104 based on an IP address and port corresponding to the particular network resource.

More generally, the service landscape model, which can be maintained in electronic memory of the system 102, dictates and describes different categories of the various resources of the service landscape instance 104 that are permitted to be in each tier of the hierarchical topology. The service landscape model also can describe which network resources in the service landscape instance 104 are permitted to communicate with other resources as well as the security requirements for connectivity. Thus, based on any combination of these categories and attributes, as dictated by the service landscape model, the categorizing module 206 categorizes each of the network resources comprising the service landscape instance 104.

The rule-generating module 208 operates in response to the provisioning of a new network resource. The rule-generating module 208 responds to the provisioning of a new network resource by automatically generating one or more security policy rules for the newly-provisioned network resource. The security policy rules of the newly-provisioned network resource can include rules that specify required security actions with respect to the IP addresses and ports of the other, already-existing network resources with which the newly-provisioned network resource is permitted to communicate, as determined by the service landscape model.

For example, in provisioning a database server, the service landscape model may permit the database server to communicate with all application servers within the service landscape instance 104. However, any connectivity to one or more other network resources, such as a DMZ-tier web server may be prohibited. The service landscape model, additionally, may or may not require a particular level of network encryption for communications between the newly-provisioned database server and an application server. The various requirements dictated by the service landscape model are used by the rule-generating module 208 to automatically generate an appropriate set of security policy rules for the newly-provisioned network resource.

Operatively, the policy-updating module 210 updates the security policy rules of at least some of the already-existing network resources when a new network resource is provisioned in the service landscape instance 104. More particularly, the policy-updating module 210 can be configured to determine those already-existing network resources that are eligible to communicate with the newly-provisioned network resource. The policy-updating module 210 then updates the security policy rules for those identified network resources so as to include the newly-provisioned network resource as a remote resource, based on the landscape service model.

For example, after provisioning a database server, the service landscape model may dictate that all application servers can communicate with database servers, but that strong network encryption is required. Accordingly, the policy-updating module 210 identifies each existing network resources in the service landscape instance 104 that is permitted to connect to the newly-provisioned database server and updates the security policy rules of each. In this example, the rules specify the security actions required under the service landscape model for communicating with the newly-provisioned database server.

The system 102 can comprise an administrative domain provisioning manager with which different procedures, according to different embodiments, can be implemented for updating the run-time policy of each existing network resource within the service landscape instance 104 that is impacted by the provisioning of a new network resource. In one embodiment, the administrative domain provisioning manager of the system 102 can push new or updated security policy rules to each impacted network resource within the service landscape instance 104. In an alternate embodiment, the administrative domain provisioning manager of the system 102 can instead notify each impacted network resource within the service landscape instance 104, and in turn, each impacted network resource can request the new or updated security policy rules from the administrative domain provisioning manager. In yet another embodiment, each network resource within the service landscape instance 104 can request the most current copy of the security policy rules from the administrative domain provisioning manager. The requests can be conveyed at regularly scheduled times, such as the time of day, or time intervals. Alternately, however, the requests can be conveyed at randomly selected times or time intervals.

Figure 3:
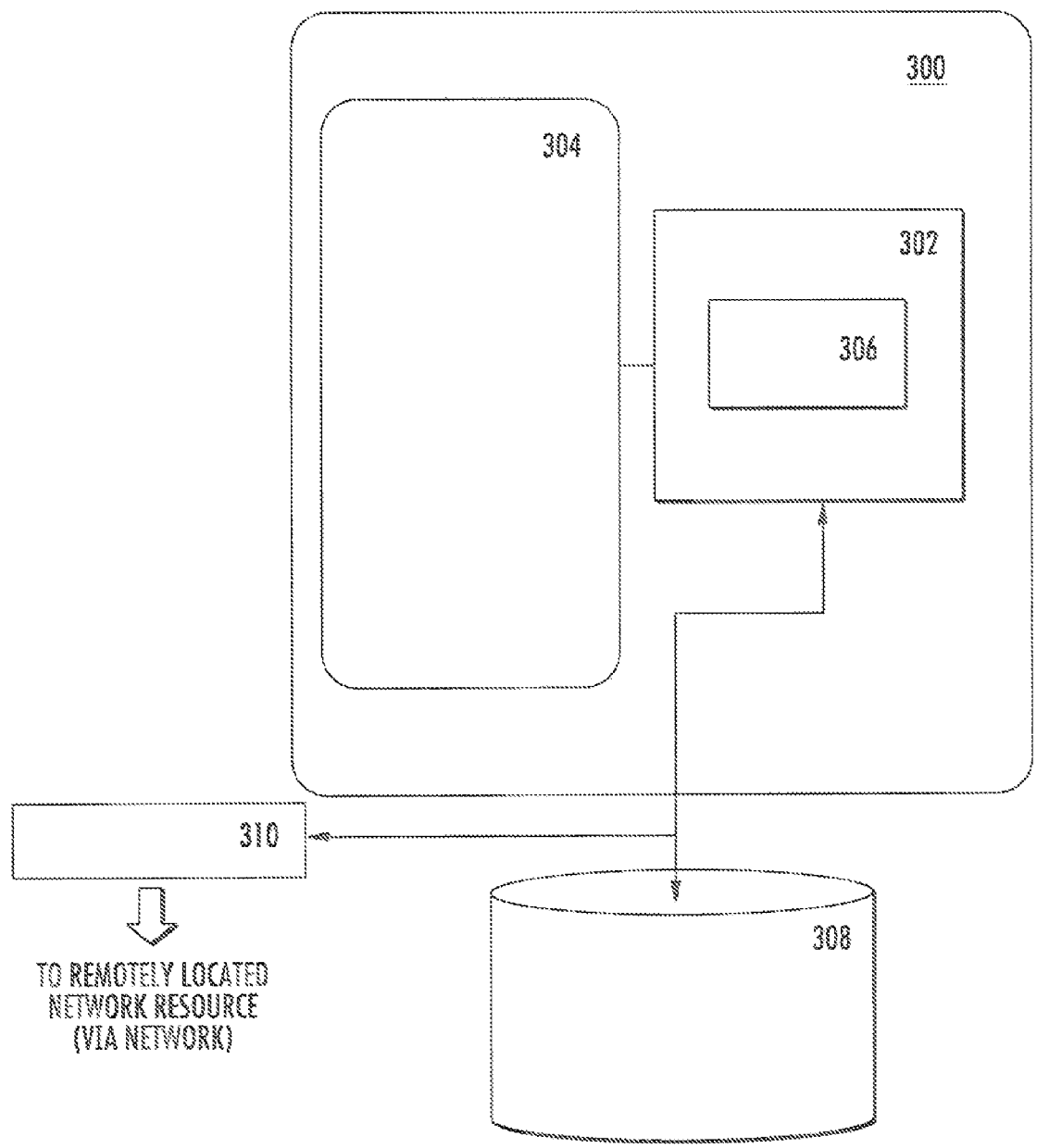
FIG. 3 is a schematic view of a system for updating network security policy rules when network resources are provisioned in a service landscape instance, according to another embodiment of the invention.

FIG. 3 is a schematic view of a system 300 for updating network security policy rules when network resources are provisioned in a service landscape instance, according to an alternate embodiment. The system 300 can operate in a network environment of the type already described. Illustratively, the system 300 includes one or more processors 302 for executing processor-executable code. Again, the one or more processors 302 can exist on the same computing device or in different, communicatively linked computing devices. The system 300 also optionally includes one or more memory elements 304 for electronically storing processor-executable instructions and Illustratively, the system 300 further includes a name-associating module 306 configured to execute on the one or more processors for responding when a network resource is provisioned. The name-associating module 306 responds to the provisioning of a network resource by adding the newly-provisioned network resource to a pre-existing resource database 308 of the service landscape instance. The name-associating module 306 is further configured to associate a group name with the newly-provisioned network resource. The group name corresponds to a collection of network resources that are referred to in pre-configured policy rules specifying required security actions for the network resources of the service landscape instance, and can be specified in place of a network address in the configured policy rule.

If a service landscape model changes—as may occur when a new application is deployed in a service landscape instance—a new security policy rule is required to permit communication among network resources of the service landscape instance. However, if the service landscape model is unchanged even though a new network resource is added to the resource database 308, it is possible that a complete reload of the resulting policy from an administrative domain configuration manager to impacted resources can be avoided. Thus, this embodiment permits individual network resources in the service landscape instance to rebuild their local version of the policy by re-reading the resource database 308 and adding the newly-provisioned resource to a resource group identified in the policy. The resource group permits a placeholder to be specified in the policy for certain network resources, again, based on the service landscape model. Then the local resource transforms the configured policy to a form suitable for run-time use on the local system it can create new run-time rules for the newly-provisioned resources that were added to the resource group.

The system 300 can comprise an administrative domain provisioning manager. In instances when new security policy rules are created without a necessary reload of the policy, different procedures can be effected for updating a network resource run-time policy. According to one embodiment, the administrative domain provisioning manager can push the new resource database 308 to the network resources in the service landscape instance so that each network resource can re-read the resource database 308 and update a run-time form of that network resource's policy. Thus, optionally, the system 300 can include a network interface 310 for pushing the new resource database 308 via network links to other network resources in the service landscape instance.

Alternatively, the administrative domain provisioning manager can notify each impacted network resource that the resource database 308 has been updated, and in turn, each impacted network resource can request the most current resource database for updating its run-time form of the policy accordingly. In yet another embodiment, network resources in the service landscape instance can request the most current resource database 308 from the administrative domain provisioning manager. Again, such requests can be conveyed at regularly scheduled times, such as the time of day, or time intervals. Still, alternatively, the requests can be conveyed at randomly selected times or time intervals.

Figure 4:
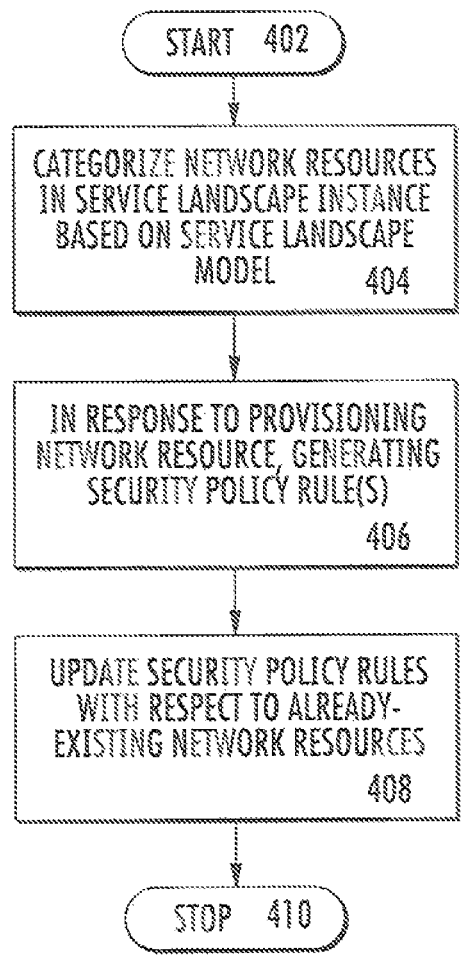
FIG. 4 is a flowchart of exemplary steps in a method for updating network security policy rules when network resources are provisioned in a service landscape instance, according to yet another embodiment of the invention.

Certain method aspects of the invention are illustrated in FIG. 4. FIG. 4 is a flowchart of exemplary steps in a computer-implemented method 400 for updating network security policy rules when network resources are provisioned in a service landscape instance, according to another embodiment of the invention. After the start at block 402, the method 400 illustratively includes categorizing network resources in a service landscape instance based on a service landscape model at block 404. The method 400 further includes at block 406 responding to the provisioning a network resource by automatically generating one or more security policy rules for the newly-provisioned network resource. Additionally, at block 408, the method 400 includes updating security policy rules of pre-existing network resources in the service landscape instance that are determined to be eligible to communicate with the newly-provisioned network resource so as to include the newly-provisioned network resource as a remote resource based on the service landscape model. The method illustratively concludes at block 410.

According to one embodiment, the step of categorizing network resources at block 404 comprises categorizing each network resource according to a role the network resource performs in the service landscape instance and according to a tier occupied by the network resource in a multi-tier hierarchical topology determined based upon the service landscape model. In another embodiment, the step of categorizing network resources at block 404 includes categorizing the network resources based on at least one among a Transmission Control Protocol (TCP port number, a User Datagram Protocol (UDP) transport type specification, a Session Initiation Protocol (SIP) transport type specification, Internet Protocol (IP) IDs, corresponding IP addresses, layer 2 MAC addresses, and/or Virtual LAN IDs.

The method 400 can further comprise securely maintaining at least a portion of the network resources implemented in computer-executable code in a network-connected database, the database configured to be accessible to an administrative domain provisioning manager.

In still another embodiment, the step of automatically generating one or more security policy rules at block 406 comprises performing determining permitted connectivity between the newly-provisioned network resource and other network resources in the service landscape instance and/or determining a level of network encryption for communication between the newly-provisioned network resource and other network resources in the service landscape instance.

The step of updating policy rules at block 408, according to yet another embodiment, can comprise identifying which network resources in the service landscape instance can communicate with the newly-provisioned network resource and updating security policy rules that allow connectivity to the newly-provisioned network resource according to security actions required by the service landscape model.

According to yet another embodiment, the method 400 can further comprise updating a run-time policy of each network resource impacted by the provisioning of the network resource, wherein updating each run-time policy comprises pushing the one or more security policy rules and updated security policy rules to each impacted network resource from an administrative domain provisioning manager. Alternatively, the method 400 can further comprise updating a run-time policy of each network resource impacted by the provisioning of the network resource by the administrative domain provisioning manager notifying each impacted network resource, wherein the automatically-generated one or more security policy rules and updated policy rules are combined to define a new policy, and wherein each impacted network resource can request the new policy from the administrative provisioning manager. In yet another embodiment, wherein the automatically-generated one or more security policy rules and updated policy rules are combined to define a new policy, the run-time policy updating can comprise at least one network resource in the service landscape instance requesting a most current version of the new policy from an administrative domain provisioning manager at a predefined time or during a predefined time interval.

Figure 5:
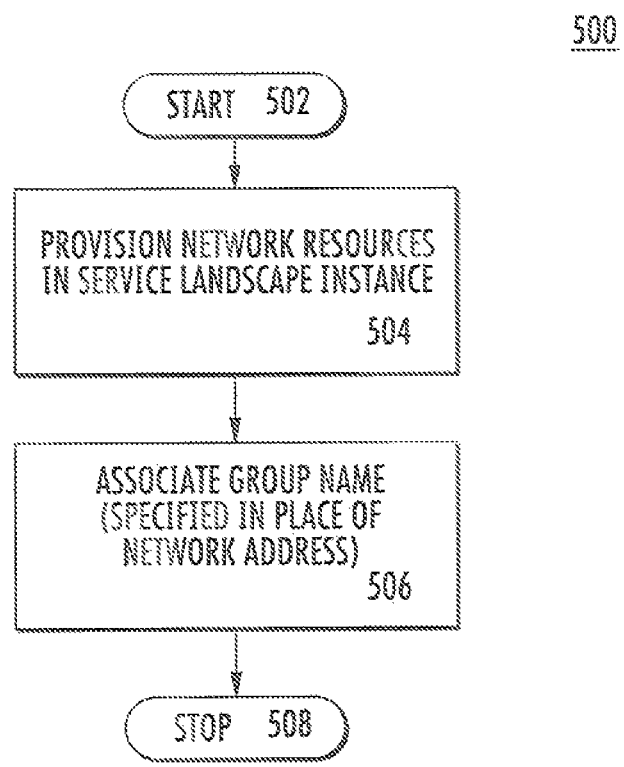
FIG. 5 is a flowchart of exemplary steps in a method for updating network security policy rules when network resources are provisioned in a service landscape instance, according to still another embodiment of the invention.

FIG. 5 is flowchart of exemplary steps in a method 500 for updating network security policy rules when network resources are provisioned in a service landscape instance, according to an alternate embodiment. The method 500, after the start at block 502, includes provisioning a network resource to the service landscape instance at block 504. In this step, the network resource is provisioned by adding the newly-provisioned network resource to a pre-existing network resource database. The method 500 further includes associating a group name with the newly-provisioned network resource at block 506. The group name corresponds to a collection of network resources that are referred to in pre-configured policy rules specifying required security actions for the network resources of the service landscape instance. According to this embodiment, the group name is specified in place of a network address in the configured policy rule. The method 500 illustratively concludes at step 508.

In a particular embodiment, the provisioning step at block 504 comprises deploying a new application in the service landscape instance and reconfiguring the service landscape model to include a new security policy rule for communications between the new application and other network resources of the service landscape instance.

In an alternate embodiment, the provisioning step at block 504 comprises adding the newly-provisioned network resource without altering the service landscape model and rebuilding a local version of the policy rules at each network resource impacted by the provisioning step. The rebuilding step can comprise re-reading the network resource database and adding the newly-provisioned network resource to the resource group maintained in the local version of the policy rules. According to this embodiment, the method 400 can further include creating at each impacted network resource new run-time rules corresponding to the newly-provisioned network resource when the configured policy is transformed to a form suitable for run-time use. Creating new run-time rules can comprise pushing the resource database containing the newly-provisioned network resource from an administrative domain provisioning manager to each impacted network resource in the service landscape instance so as to permit the re-reading of the resource database and updating of run-time form of the configured policy. Alternatively, creating the run-time rules can comprise notifying each impacted network resource that the resource database has been updated, and requesting by at least one impacted network resource a current version of the resource database to permit updating of a run-time form of the configured policy of the at least one impacted network resource. As yet another alternative, the run-time rules can be created by at least one impacted network resource requesting from an administrative domain provisioning manager a current version of the resource database to permit updating of a run-time form of the configured policy of the at least one impacted network resource.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, such as magnetic tape or optically-readable disk having computer-readable code defining a computer program embedded therein, which when loaded to and executed by a computer implements the methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented method for updating network security policy rules when network resources are provisioned in a service landscape instance, the method comprising:
   categorizing pre-existing network resources in a service landscape instance based on a service landscape model;
   responsive to provisioning a new network resource for the service landscape instance, automatically generating one or more security policy rules for the new network resource, and wherein associating the new network resource with a group name corresponding to a collection of the pre-existing network resources; and
   updating security policy rules of the pre-existing network resources in the service landscape instance, wherein the updated security policy rules describe which pre-existing network resources are permitted to communicate directly with the new network resource as well as security requirements for connectivity so as to include the new network resource as a remote resource based on the service landscape model,
   wherein each of the new network resource and the pre-existing resources comprises a software application residing on a computing device.

2. The method of claim 1, wherein the step of categorizing the pre-existing network resources comprises categorizing each pre-existing network resource according to a role the pre-existing network resource performs in the service landscape instance and according to a tier occupied by the pre-existing network resource in a multi-tier hierarchical topology determined based upon the service landscape model.

3. The method of claim 1, wherein the step of categorizing the pre-existing network resources includes categorizing the pre-existing network resources based on at least one among a Transmission Control Protocol (TCP port number, a User Datagram Protocol (UDP) transport type specification, a Session Initiation Protocol (SIP) transport type specification, Internet Protocol (IP) IDs, corresponding IP addresses, layer 2 MAC addresses, and/or Virtual LAN IDs described in the service landscape model.

4. The method of claim 1, further comprising securely maintaining at least a portion of the pre-existing network resources implemented in computer-executable code in a network-connected database, the database configured to be accessible to an administrative domain provisioning manager.

5. The method of claim 1, wherein the step of automatically generating one or more security policy rules comprises performing at least one of determining permitted connectivity between the new network resource and the pre-existing network resources in the service landscape instance and determining a level of network encryption for communication between the new network resource and the pre-existing network resources in the service landscape instance.

6. The method of claim 1, wherein the step of updating policy rules comprises identifying which of the pre-existing network resources in the service landscape instance can communicate with the new network resource and updating security policy rules that allow connectivity to the new network resource according to security actions required by the service landscape model.

7. The method of claim 1, further comprising updating a run-time policy of each pre-existing network resource impacted by the provisioning of the new network resource, wherein updating each run-time policy comprises pushing the one or more security policy rules and updated security policy rules to each impacted pre-existing network resource by an administrative domain provisioning manager.

8. The method of claim 1, further comprising updating a run-time policy of each pre-existing network resource impacted by the provisioning of the new network resource by an administrative domain provisioning manager notifying each impacted pre-existing network resource, wherein the automatically generated one or more security policy rules and updated policy rules are combined to define a new policy, and wherein each impacted pre-existing network resource can request the new policy from the administrative provisioning manager.

9. The method of claim 1, wherein the automatically generated one or more security policy rules and updated policy rules are combined to define a new policy, and further comprising at least one pre-existing network resource in the service landscape instance requesting a most current version of the new policy from an administrative domain provisioning manager at a predefined time or during a predefined time interval.

10. A computer-implemented method for updating network security policy rules when network resources are provisioned in a service landscape instance, the method comprising:
  performing, via a processor, the steps of:
    provisioning a new network resource to the service landscape instance by adding the new network resource to a pre-existing network resource database; and
    associating a group name with the new network resource, the group name corresponding to a collection of pre-existing network resources that are referred to in the policy rules specifying required security actions for the pre-existing network resources of the service landscape instance, wherein the group name is specified in place of a network address in the configured policy rule,
  updating security policy rules of the pre-existing network resources in the service landscape instance, wherein the updated security policy rules describe which pre-existing network resources are permitted to communicate directly with the new network resource as well as security requirements for connectivity so as to include the new network resource as a remote resource based on a service landscape model; an
  wherein each of new network resource and the pre-existing resources comprise a software application residing on a computing device.

11. The method of claim 10, wherein the provisioning step comprises deploying a new application in the service landscape instance and reconfiguring the service landscape model to include a new security policy rule for communications between the new application and the pre-existing network resources of the service landscape instance.

12. The method of claim 10, wherein the provisioning step comprises adding the new network resource without altering the service landscape model, and further comprising rebuilding a local version of the policy rules at each of the pre-existing network resources impacted by the provisioning step.

13. The method of claim 12, wherein the rebuilding step comprises re-reading the network resource database and adding the new network resource to the resource group maintained in the local version of the policy rules.

14. The method of claim 13, further comprising creating at each impacted pre-existing network resource new run-time rules corresponding to the new network resource when the configured policy is transformed to a form suitable for run-time use.

15. The method of claim 14, further comprising pushing the resource database containing the new network resource from an administrative domain provisioning manager to each impacted pre-existing network resource in the service landscape instance to permit the re-reading of the resource database and updating of run-time form of the configured policy.

16. The method of claim 14, further comprising notifying each impacted pre-existing network resource that the resource database has been updated, and requesting by at least one impacted pre-existing network resource a current version of the resource database to permit updating of a run-time form of the configured policy of the at least one impacted pre-existing network resource.

17. The method of claim 14, further comprising at least one impacted pre-existing network resource requesting from an administrative domain provisioning manager a current version of the resource database to permit updating of a run-time form of the configured policy of the at least one impacted pre-existing network resource.

18. A system for updating network security policy rules when network resources are provisioned in a service landscape instance, the system comprising:
  one or more processors for executing processor-executable code;
  a categorizing module configured to execute on the one or more processors for categorizing network pre-existing resources in a service landscape instance based on a service landscape model;
  a rule-generating module configured to execute on the one or more processors for responding to a provisioning of a new network resource by automatically generating one or more security policy rules for the new network resource, and wherein associating the new network resource with a group name corresponding to a collection of the pre-existing network resources; and
  an policy-updating module configured to execute on the one or more processors for updating security policy rules of the pre-existing network resources in the service landscape instance, wherein the updated security policy rules describe which pre-existing network resources are permitted to communicate directly with the new network resource as well as security requirements for connectivity so as to include the new network resource as a remote resource based on the service landscape model,
  wherein each of new network resource and the pre-existing resources comprise a software application residing on a computing device.

19. The system of claim 18, further comprising a configuring module for configuring the service landscape model to provide categories for the pre-existing network resources in the service landscape instance, wherein the pre-existing network resources allowed in each tier of a hierarchical topology dictated by the model are categorized, the pre-existing network resources that are permitted to communicate with other network resources are identified, and security requirements for network communications between different ones of the pre-existing network resources are specified.

20. A system for updating network security policy rules when network resources are provisioned in a service landscape instance, the system comprising:

one or more processors for executing processor-executable code;

a name-associated module configured to execute on the one or more processors for responding when a new network resource is provisioned by adding the new network resource to a pre-existing resource database of the service landscape instance, the module further configured to associate a group name with the new network resource, wherein the group name corresponds to a collection of pre-existing network resources that are referred to in pre-configured policy rules specifying required security actions for the pre-existing network resources of the service landscape instance, and wherein the group name is specified in place of a network address in the configured policy rule, ti updating security policy rules of the pre-existing network resources in the service landscape instance, wherein the updated security policy rules describe which pre-existing network resources are permitted to communicate directly with the new network resource as well as security requirements for connectivity so as to include the new network resource as a remote resource based on a service landscape model; an wherein each of new network resource and the pre-existing resources comprise a software application residing on a computing device.

* * * * *